Patented July 1, 1952

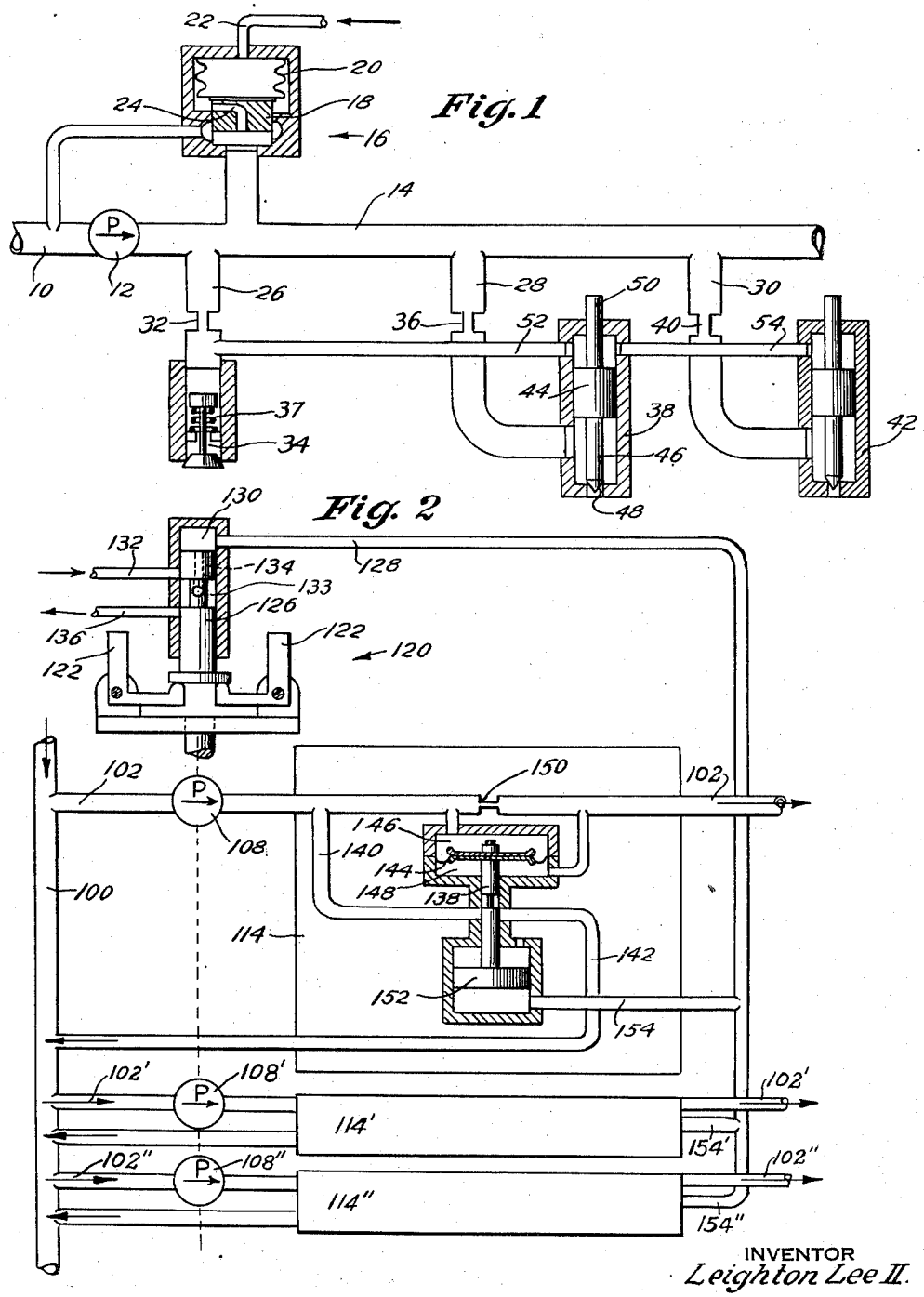

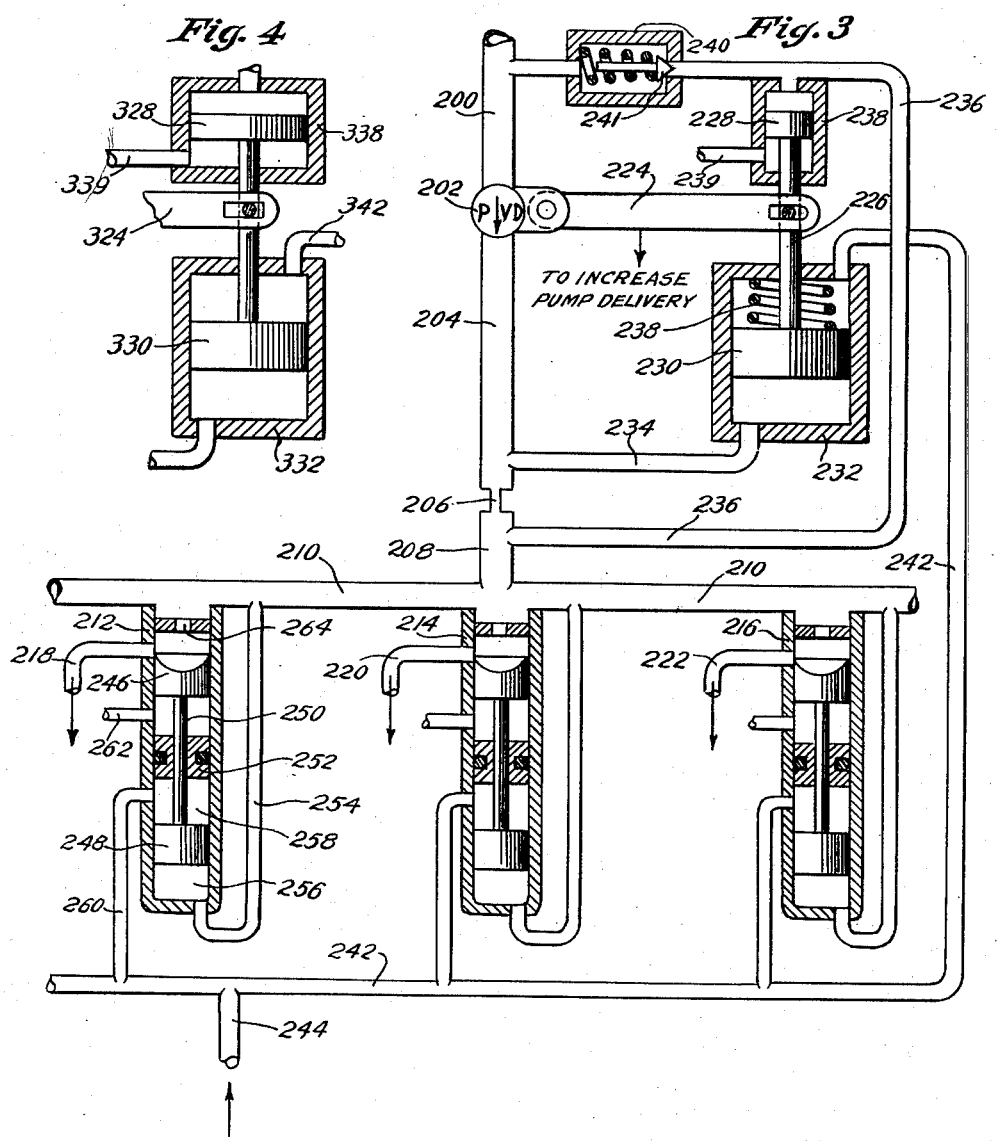

2,601,849

UNITED STATES PATENT OFFICE 2,601,849

FLUID DISTRIBUTING APPARATUS

Leighton Lee II, Rocky Hill, Conn., assignor to Niles-Bement-Pond Company, West Hartford, Conn., a corporation of New Jersey Application November 21, 1947, Serial No. 787,415

9 Claims. (Cl. 123—119)

The present invention relates to apparatus for distributing equal quantities of fluid from a common source to a number of discharge points. The several modifications of the invention illustrated show arrangements which may be used in distributing fuel to the several nozzles of a turbine engine.

The present invention is an improvement on the structure shown and claimed in the copending application of Milton E. Chandler, Serial No. 782,757, filed October 29, 1947.

In systems of this type, wherein a main supply line delivers into several branch distributing lines, it is customary to provide each branch line with an individual flow control valve. Mechanism for simultaneously controlling a number of individual valves which may be widely separated tends to be complicated.

In some fluid distributing systems of the prior art, it has been proposed to place an individual pump in each distributing branch line, and to drive all the pumps from a common power source so that all operate at the same speed. Difficulties in such systems have been encountered because of variations in the adjustment and volumetric efficiency of the individual pumps.

Another type of prior art system employs a single variable delivery pump employing a number of individually controlled branch conduits. Where such a system is used, it is necessary to control the individual branch conduit valves concurrently with the pump delivery control to avoid building up excessive pressures at the discharge side of the pump.

An object of the present invention is to provide improved and simplified fluid distributing apparatus.

Another object is to provide a fluid distributing system including a main supply conduit and a plurality of branch conduits in which each branch conduit is controlled by a valve responsive to the pressure drop across an orifice in that branch conduit balanced against a variable control fluid pressure.

A further object is to provide a flow control system for the discharge line of a pump, in which the flow is regulated in accordance with the pump speed to compensate for variations in the volumetric efficiency of the pump.

A further object is to provide a fluid distributing system including a pump in each branch distributing line and a common control to compensate for variations in volumetric efficiency of the individual pump.

Another object is to provide a fluid distributing system including a metering orifice in the main supply line as well as in each individual branch conduit, and coordinated control of the flows in the main lines and in the branch conduits.

A further object is to provide a system of the type described, in which means is provided to compensate the flow in the main lines for accidental variations in flow in the individual branch lines to eliminate undesirable building up of pressure in the event of clogging one of the branch lines.

Other objects and advantages of my invention will become apparent from a consideration of the appended specification, claims and drawings, in which Figure 1 illustrates, somewhat diagrammatically, a fluid distributing system embodying certain features of my invention, Figure 2 illustrates, also somewhat diagrammatically, a fluid distributing system employing individual pumps in the branch lines and means for compensating for variations in volumetric efficiency of the pumps, Figure 3 illustrates another embodiment of my invention, employing a single variable delivery pump and means for coordinating the pump delivery with the controls in the several branch lines, and Figure 4 illustrates a modified form of pump delivery control which may be used in place of that of Figure 3.

Referring now to Figure 1, the fluid comes from a tank (not shown) and flows through an inlet conduit 10, a pump 12, and a main discharge conduit 14. The pump discharge pressure is regulated by a relief valve mechanism generally shown at 16. This mechanism includes a piston valve 18 operated by a bellows 20. The interior of bellows 20 is supplied with a variable control fluid pressure through a conduit 22. The exterior of bellows 20 is exposed to the pump discharge pressure through a passage 24 extending through the valve 18. The valve mechanism 16 operates to maintain the discharge pressure of pump 12 at whatever value is required to balance the force due to the variable control fluid pressure acting on bellows 20.

The fluid is distributed from conduit 14 through three branch conduits 26, 28 and 30. Branch conduit 26 includes a metering orifice 32 and a discharge valve 34 biased to closed position by a spring 37. Discharge conduit 28 includes a metering orifice 36 and a control valve 38.

The branch conduit 30 includes a similar metering restriction 40 and a control valve 42. Control valve 42 is similar in all respects to control valve 38, and only the latter will be described in detail. The control valve 38 includes a piston 44 attached by a stem 46 to a discharge valve 48. The upper end of piston 44 is attached to a guide rod 50. The space below piston 44 is subject to the fuel pressure on the downstream side of metering restriction 36. The space above piston 44 is subject to the fuel pressure in a pilot line 52, which communicates with discharge conduit 26 on the downstream side of metering restriction 32 therein. This same pressure is communicated to a similar space on control valve 42 by means of a conduit 54.

If the pressure in conduit 52 is lower than the pressure under piston 44, then the piston 44 will rise, opening the valve 48 wider. This upward movement of valve 48 will continue until the pressures are balanced on the opposite sides of piston 44. Therefore it may be seen that control valve 38 operates to maintain the pressure on the downstream side of restriction 36 equal to that on the downstream side of restriction 32. Since the pressures on the upstream sides of the two restrictions are the same, then the flow through both restrictions will be substantially the same. The system therefore operates to maintain equal flows through all the branch distributing conduits.

Figure 2

In Figure 2 fuel is delivered from the main supply conduit 100 through a number of branch conduits 102, 102' and 102". The branch conduits are provided with individual pumps 108, 108' and 108", respectively. The several branch conduits discharge through controlling mechanisms shown at 114, 114' and 114", respectively. Only the control mechanism 114 is shown in detail, the mechanisms 114' and 114" being similar.

The three pumps 108, 108' and 108" are driven by a common source of power, which also drives a governor, generally indicated at 120, having a pair of fly weights 122 which operate a pilot valve 126 to control the pressure in a pilot line 128. The pilot line 128 is connected to a chamber 130 above the valve 126, and the pressure therein acts downwardly on valve 126, in opposition to the centrifugal force acting on flyweights 122. When the pressure in chamber 130 balances the centrifugal force due to the flyweights 122, valve 126 remains in the position shown in the drawing, in which the fluid in line 128 is trapped there. If the valve 126 moves upward from the position shown in the drawing, fluid is admitted from a supply conduit 132 to the chamber 130 and conduit 128 through an annular recess 133 and passage 134 in the valve 126. If the valve 126 moves downwardly from the position shown due to a higher pressure in chamber 130, then pilot line 128 is connected to a drain conduit 136. The pressure in chamber 130 and in pilot line 128 varies with the centrifugal force acting on flyweight 122, which in turn varies with the square of the speed of the governor 120.

The control mechanism 114 includes a valve 138 in a by-pass conduit 140, 142, which extends from the pump outlet back to the main supply conduit 100. One end of the stem of valve 138 is connected to a flexible diaphragm 144 separating a pair of expansible chambers 146 and 148. A metering restriction 150 is provided in the branch conduit 102. Chamber 146 is connected to the upstream side of restriction 150 and chamber 148 is connected to the downstream side of restriction 150. The pressure drop across the restriction 150 varies with the square of the velocity of flow through the branch line 102. This pressure drop acts downwardly on diaphragm 144 and hence on valve 138. The other end of the stem of valve 138 is attached to a piston 152. The space above piston 152 is vented to atmosphere, while the space below piston 152 is connected through a conduit 154 to the pilot line 128.

The valve 138 is thus subjected to an upwardly acting force which varies as the square of the speed of the pump 108 and to a downwardly acting force which varies as the square of the rate of flow through restriction 150. When these forces become unbalanced, valve 138 is operated to restore the balanced condition. Hence it may be stated that valve 138 operates to maintain the flow through restriction 150 proportional to the speed of pump 108. It therefore compensates for any variation in volumetric efficiency of pump 108.

The branch conduits 102' and 102" are provided with control mechanisms 114' and 114", respectively, which operate the same as control mechanism 114. The control mechanisms 114' and 114" are connected by conduits 154' and 154" respectively to the pilot line 128. The flow through each of the branch conduits is therefore controlled in the same manner, so that equal quantities of fluid flow through each branch conduit, providing the areas of the metering restrictions such as 150 are equal. If unequal flows are required, then metering restrictions of unequal area may be used.

Figure 3

In this figure the incoming fuel enters an inlet conduit 200 and passes through a variable delivery pump 202, a conduit 204, a metering restriction 206, a conduit 208, a conduit 210, and thence through individual control valves 212, 214 and 216 to branch discharge conduits 218, 220 and 222, respectively. The pump 202 is provided with a delivery control lever 224 pivoted at its left end to the pump structure. The pump structure is such that when the lever 224 is moved clockwise, the pump delivery is increased, as indicated by the legend on the drawing. The right end of lever 224 is connected by means of a pin and slot connection to a rod 226 connecting two opposed pistons 228 and 230.

Piston 230 moves in a cylinder 232. The pressure acting on the lower face of piston 230 is that at the upstream side of restriction 206, which is conveyed to cylinder 232 through a conduit 234. The cylinder 232 above piston 230 is connected through a conduit 242 to a conduit 244 supplied with a variable control fluid pressure from any suitable source.

Piston 228 moves in a cylinder 237, the space under piston 228 is vented to atmosphere, as at 239. The space above piston 228 is connected through conduit 236 to the conduit 208 on the downstream side of restriction 206. An emergency relief valve 240 permits fluid to flow from conduit 236 to the pump inlet conduit 200 in case of excessive pressures developing in conduit 208.

Each of the control valve mechanisms 212, 214 and 216 is similar and only the mechanism 212 will be described in detail. Valve mechanism 212 includes a pair of pistons 246 and 248 connected by a rod 250. The rod extends through a bushing 252, so that each piston acts in an individual cylinder not in fluid communication with the cylinder of the other piston. The fluid pressure in conduit 210 is conveyed through a conduit 254 to the space 256 under piston 248. Space 258 above piston 248 is connected through a conduit 260 to the conduit 242. The space under piston 246 is vented to atmosphere, as at 262. Fluid entering the valve mechanism 212 passes through a metering orifice 264. The upper face of piston 246 is subject to the fluid pressure on the downstream side of orifice 264, and its peripheral edge serves as a valve to control the flow of fluid through a port leading to the discharge conduit 218. The valve mechanism 212 is subject to an upwardly acting force which is a measure of the flow through orifice 264, since the pressure on the upstream side of that orifice acts upwardly in chamber 256 while the pressure on its downstream side acts downwardly on the upper surface of piston 246. At the same time, the variable control fluid pressure acts downwardly on the upper surface of piston 248. Therefore, when the flow is such that the pressure differential across orifice 264 balances the variable control fluid pressure in chamber 258, the valve remains stationary. Otherwise, it moves to correct the flow until such a condition of balance is obtained.

Hence, under normal operating conditions, the valve mechanisms 212, 214 and 216 control the flow into three discharge conduits 218, 220 and 222, so as to make those flows equal.

The pistons 230 and 228 operate the pump delivery control lever 224 so as to maintain the pressure drop across restriction 206 proportional to the variable control fluid pressure in conduit 244. The area of metering restriction 206 is so chosen with respect to the area of the orifices such as 264 and valve mechanism 212 and with respect to the areas of pistons 230 and 228, so that the flow through restriction 206 equals the sum of the flow through the orifices 264.

In case one of the discharge conduits 218, 220 or 222 should become partially clogged, the pump would try to deliver through conduit 210 the same total flow which would be expected when that conduit were not partially clogged, if some means were not provided to prevent it. In such an event, all the pressures in the system on the downstream side of the pump would begin to rise. The occurrence of excessive pressure from this cause is avoided by the use of different areas on pistons 230 and 228. Because of these unbalanced areas, increase in the discharge pressure of pump 202 will cause the movement of delivery control lever 224 in a delivery decreasing direction. This delivery decreasing force is balanced by spring 238. Therefore, as the pump discharge pressure tends to increase, piston 230 moves the pump delivery control lever 224 in a delivery decreasing direction until a balance of forces is restored on pistons 228 and 230.

An emergency relief or safety valve is provided at 240, to take care of any accidental excessive pressures which might occur in the system in spite of the unbalancing of pistons 230 and 228.

*Figure 4*

This figure illustrates a modified form of pump delivery control mechanism which takes the place of the piston 230 and 228 of Figure 3. In this arrangement the two pistons are balanced, and excessive pressures will therefore occur, so that a relief valve such as 240 of Figure 3 must be provided.

Those elements in Figure 4 which correspond to similar elements in Figure 3 have been given reference numerals in the 300 series corresponding to the reference numerals in Figure 3 in the 200 series.

The terms and expressions as used herein are intended as terms of description and not of limitation, and I have no intention, in the use of such terms and expressions, of excluding any equivalent of the structures shown herein or parts thereof, but recognize that various modifications are possible within the scope of the invention claimed.

I hereby claim as my invention:

1. Apparatus for distributing fluid from a common source to a plurality of discharge points in proportionate quantities, comprising a plurality of branch conduits, each leading from said source to one of said points, a fixed capacity pump in each of said conduits, a metering restriction in each of said conduits, a by-pass conduit for each pump extending from the outlet to the inlet thereof, a valve in each said by-pass conduit, common drive means for all said pumps, speed responsive means operated by said drive means for controlling a fluid pressure proportional to the square of the speed of said drive means, and operating means for each of said by-pass valves including means responsive to said fluid pressure acting in a valve closing direction and means responsive to the pressure drop across its associated metering restriction acting in a valve opening direction, said by-pass valves and their operating means being effective to maintain the flow through each metering restriction proportional to the speed of said drive means, and thereby to compensate for variations in the volumetric capacity of the individual pumps.

2. Apparatus for controlling the delivery of a pump in proportion to its speed, comprising a fixed capacity pump, a delivery conduit leading from said pump, a metering restriction in said delivery conduit, a by-pass conduit leading from the outlet to the inlet of said pump, a valve in said by-pass conduit, means for driving said pump, speed-responsive means operated by said drive means for controlling a fluid pressure proportional to the square of the speed of said drive means, and operating means for said valve including means responsive to said fluid pressure acting in a valve closing direction and means responsive to the pressure drop across said metering restriction acting in a valve opening direction.

3. Apparatus for controlling the delivery of a pump in proportion to its speed, comprising a fixed capacity pump, a delivery conduit leading from said pump, a metering restriction in said delivery conduit, a by-pass conduit leading from the outlet to the inlet of said pump, a valve in said by-pass conduit, and operating means for said valve including means responsive to the speed of said pump acting in a valve closing direction and means responsive to the pressure drop across said metering restriction acting in a valve opening direction.

4. Apparatus for controlling a fluid pressure in proportion to the square of the speed of a rotating shaft, comprising a centrifugal governor driven by said shaft, a cylinder, a piston valve movable longitudinally in said cylinder, an operative connection between said governor and said piston valve for causing longitudinal movement of said valve, said cylinder and piston valve forming a chamber at one end of said valve wherein the pressure acts on said valve in opposition to said governor, spaced inlet and outlet ports opening into said cylinder, said valve having a normal position in which both ports are closed and being effective upon a change in speed of said shaft to open one of said ports and thereby change the pressure in said chamber to balance the centrifugal force acting on the valve and to restore the valve to its neutral position.

5. Apparatus for establishing proportionate rates of fluid flow through a plurality of conduits, comprising a metering restriction in each of said conduits, a valve associated with each conduit for controlling the rate of fluid flow therethru, a control conduit containing a fluid under a substantially static pressure, operating means for each of said valves including means responsive to an increase in the pressure drop across its associated restriction for moving said valve in a direction to decrease said flow, and means responsive to said control conduit pressure for moving said valve in the opposite direction.

6. Apparatus for distributing fluid from a common source to a plurality of outlets in proportionate quantities, comprising a main delivery conduit extending from said source, a metering restriction in said main conduit, a plurality of branch conduits extending from said main conduit at the downstream side of the restriction therein to said outlets, a metering restriction in each of said branch conduits, a valve in each of said branch conduits for controlling the flow therethru, a control conduit containing fluid under pressure, operating means for each valve including means responsive to the pressure drop across its associated restriction for moving said valve in a closing direction, and means responsive to said control conduit pressure for moving said valve in the opposite direction, means for controlling the flow thru said main conduit, and operating means for said controlling means including means responsive to the pressure drop across said main conduit restriction for operating said control means in a flow decreasing direction, and means responsive to said control conduit pressure for moving said controlling means in the opposite direction.

7. Apparatus as in claim 6, in which said means responsive to the pressure drop across said main conduit restriction is slightly unbalanced with respect to the pressure at said source, so that an increase in said source pressure causes operation of said control means in a flow decreasing direction.

8. Apparatus as in claim 7, in which said means responsive to the pressure drop across said main conduit restriction includes a spring opposing the effect of said unbalanced pressure.

9. Apparatus as in claim 6, in which said source includes a variable delivery pump, said main conduit flow controlling means includes means for varying the delivery of said pump, and including an emergency relief valve for venting the pump outlet to the pump inlet whenever the pump outlet pressure exceeds a predetermined value.

LEIGHTON LEE II.

REFERENCES CITED

The following references are of record in the file of this patent:

UNITED STATES PATENTS

| Number | Name | Date |
|---|---|---|
| 1,272,212 | Callan | July 9, 1918 |
| 2,069,744 | Alden | Feb. 9, 1937 |
| 2,191,186 | Amery | Feb. 20, 1940 |
| 2,283,266 | Kinsella | May 19, 1942 |
| 2,313,797 | Bailey | Mar. 16, 1943 |
| 2,430,264 | Wiegand | Nov. 4, 1947 |

FOREIGN PATENTS

| Number | Country | Date |
|---|---|---|
| 526,869 | Germany | Feb. 26, 1923 |
| 577,132 | Great Britain | May 7, 1946 |